US012098887B2

(12) United States Patent
Gupte et al.

(10) Patent No.: US 12,098,887 B2
(45) Date of Patent: Sep. 24, 2024

(54) HEAT EXCHANGER FOR HVAC UNIT

(71) Applicant: Johnson Controls Tyco IP Holdings LLP, Milwaukee, WI (US)

(72) Inventors: Neelkanth S. Gupte, Katy, TX (US); Zhiwei Huang, Moore, OK (US); Curtis A. Trammell, Newcastle, OK (US)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 161 days.

(21) Appl. No.: 17/477,298

(22) Filed: Sep. 16, 2021

(65) Prior Publication Data

US 2022/0003504 A1 Jan. 6, 2022

Related U.S. Application Data

(63) Continuation of application No. 16/037,797, filed on Jul. 17, 2018, now abandoned.

(60) Provisional application No. 62/678,084, filed on May 30, 2018.

(51) Int. Cl.
*F28D 1/053* (2006.01)
*F28D 1/047* (2006.01)

(52) U.S. Cl.
CPC ....... *F28D 1/05383* (2013.01); *F28D 1/0476* (2013.01); *F28D 1/05333* (2013.01)

(58) Field of Classification Search
CPC . F28D 1/05383; F28D 1/0476; F28D 1/05333
USPC ...................................... 165/173
See application file for complete search history.

(56) References Cited

U.S. PATENT DOCUMENTS

| 2,286,271 | A | * | 6/1942 | Higham | ................. B21C 23/10 |
| | | | | | 165/172 |
| 2,883,165 | A | | 4/1959 | Jensen et al. | |
| 5,101,890 | A | | 4/1992 | Aoki et al. | |
| 5,314,013 | A | | 5/1994 | Tanabe | |
| 6,644,393 | B2 | | 11/2003 | Roberts et al. | |

(Continued)

FOREIGN PATENT DOCUMENTS

| CN | 103644685 A | 3/2014 |
| CN | 104913548 A | 9/2015 |

(Continued)

OTHER PUBLICATIONS

R. L. Webb et al., Design of Light Weigh Heat Exchangers for Air to Two-Phase Service, Compact Heat Exchangers, 1990, 8 pgs., Hemisphere Publishing Corporation.

(Continued)

*Primary Examiner* — Claire E Rojohn, III
(74) *Attorney, Agent, or Firm* — Fletcher Yoder, P.C.

(57) ABSTRACT

Embodiments of the present disclosure are directed to a heat exchanger system that includes a conduit configured to flow a working fluid therethrough, where the conduit has a first portion, a second portion, and a bend directly coupling the first portion and the second portion, where the first portion includes a first header connection, the second portion includes a second header connection, and the bend is distal to the first header connection and the second header connection and a support plate coupled to the bend and positioned between the first portion and the second portion of the conduit.

17 Claims, 14 Drawing Sheets

(56) References Cited

U.S. PATENT DOCUMENTS

| | | | |
|---|---|---|---|
| 6,827,139 B2* | 12/2004 | Kawakubo | F28F 9/0243 165/173 |
| 6,991,026 B2 | 1/2006 | Costen et al. | |
| 6,997,247 B2* | 2/2006 | Malone | F28D 1/0477 257/E23.098 |
| 7,108,049 B2* | 9/2006 | Makino | F28F 1/128 165/149 |
| 7,135,863 B2 | 11/2006 | Arik et al. | |
| 7,273,093 B2 | 9/2007 | Durr et al. | |
| 7,290,597 B2 | 11/2007 | Takano | |
| 8,561,427 B2* | 10/2013 | Knight | F28D 1/05391 62/519 |
| 8,739,855 B2 | 6/2014 | Fritz et al. | |
| 2003/0102112 A1 | 6/2003 | Smithey et al. | |
| 2008/0041092 A1* | 2/2008 | Gorbounov | F28D 1/0476 165/178 |
| 2010/0139891 A1* | 6/2010 | Suzuki | F28D 1/0476 165/104.31 |
| 2012/0096894 A1 | 4/2012 | Higashiyama et al. | |
| 2015/0021003 A1 | 1/2015 | Cho et al. | |
| 2015/0168072 A1 | 6/2015 | Ueno et al. | |
| 2016/0201990 A1 | 7/2016 | Voorhis, Jr. et al. | |
| 2017/0146299 A1 | 5/2017 | Steinbach et al. | |
| 2017/0211889 A1 | 7/2017 | Schwalm | |
| 2017/0284749 A1 | 10/2017 | Smith et al. | |
| 2017/0343288 A1* | 11/2017 | Joardar | F28F 9/027 |
| 2018/0066877 A1* | 3/2018 | Max | F28D 1/05383 |
| 2018/0340746 A1* | 11/2018 | Jin | F25B 39/00 |
| 2019/0003739 A1* | 1/2019 | Aoki | F24H 8/00 |

FOREIGN PATENT DOCUMENTS

| | | |
|---|---|---|
| CN | 107218822 B | 4/2019 |
| EP | 2229572 B1 | 3/2014 |
| JP | 2012202609 A | 10/2012 |

OTHER PUBLICATIONS

Danfoss, Three Danfoss Technologies Named Winners of 2020 AHR Expo Innovation Awards, https://www.danfoss.com/en/about-danfoss/news/dcs/three-danfoss-technologies-named-winners-of-2020-ahr-expo-innovation-awards/, Oct. 10, 2019, 4 pgs.

Danfoss, Increased Savings with MicroChannel Heat Exchangers, https://assets.danfoss.com/documents/DOC137686438163/DOC137686438163.pdf, Sep. 2014, 36 pgs.

Sanhua Micro Channel MCHE, https://www.youtube.com/watch?time_continue=1&v=9VX-PAT2D9l&feature=emb_logo, Aug. 20, 2013, SanhuaEurope, 7:06 minutes.

Sanhua, Micro-Channel Heat Exchangers-Standard Range, https://www.sanhuaeurope.com/static/uploads/files/catalogue/Standard_MCHE_VersionWeb.pdf, 2014, 15 pgs.

Sanhua, Micro-Channel Heat Exchangers, https://www.zjshc.com/static/uploads/files/catalogue/mche-brochure-update-2017-web.pdf, 2017, 74 pgs.

* cited by examiner

HEAT EXCHANGER FOR HVAC UNIT

CROSS REFERENCE TO RELATED APPLICATIONS

This is a continuation application of U.S. patent application Ser. No. 16/037,797, entitled "HEAT EXCHANGER FOR HVAC UNIT," filed Jul. 17, 2018, which claims priority from and the benefit of U.S. Provisional Application No. 62/678,084, entitled "HEAT EXCHANGER FOR HVAC UNIT," filed May 30, 2018, each of which is hereby incorporated by reference in its entirety for all purposes.

BACKGROUND

The present disclosure relates generally to environmental control systems, and more particularly, to a heat exchanger for a heating, ventilation, and air conditioning (HVAC) unit.

Environmental control systems are utilized in residential, commercial, and industrial environments to control environmental properties, such as temperature and humidity, for occupants of the respective environments. The environmental control system may control the environmental properties through control of an airflow delivered to the environment. In some cases, environmental control systems include a heat exchanger that is configured to exchange thermal energy, such as heat, between a working fluid flowing through conduits of the heat exchanger and an airflow flowing across the conduits. Additionally, the heat exchanger may include fins that are positioned between conduits to facilitate the transfer of thermal energy between the working fluid and the airflow. Furthermore, the heat exchanger may include headers or manifolds that are configured to direct the working fluid to and from the conduits of the heat exchanger. Unfortunately, costs of the components of existing heat exchangers are relatively high, which increases a cost of the overall environmental control system.

DRAWINGS

SUMMARY

Figure 1:
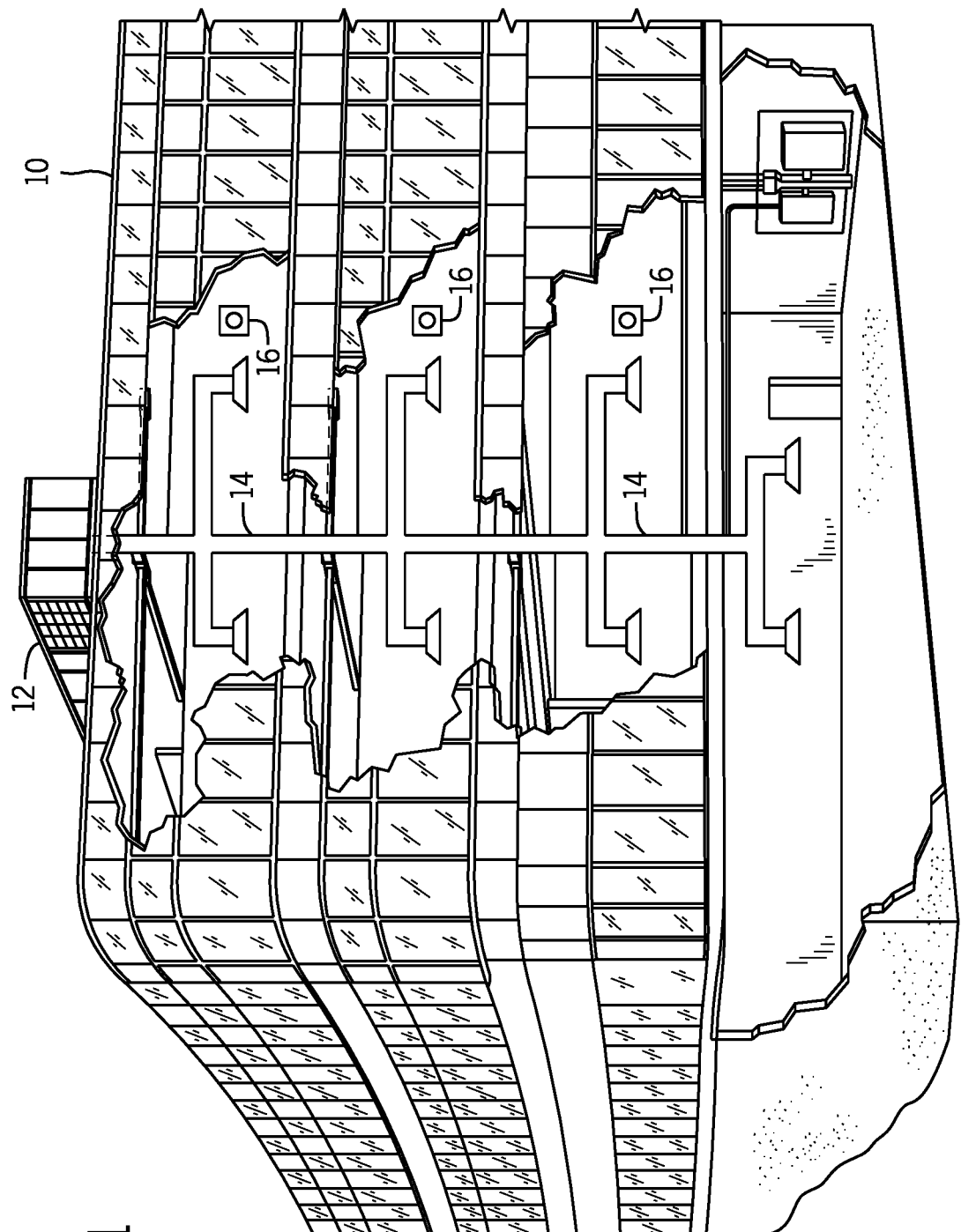
FIG. 1 is a schematic of an environmental control for building environmental management that may employ an HVAC unit, in accordance with an aspect of the present disclosure.

In one embodiment of the present disclosure, a heat exchanger system includes a conduit configured to flow a working fluid therethrough, where the conduit has a first portion, a second portion, and a bend directly coupling the first portion and the second portion, where the first portion includes a first header connection, the second portion includes a second header connection, and the bend is distal to the first header connection and the second header connection and a support plate coupled to the bend and positioned between the first portion and the second portion of the conduit.

In another embodiment of the present disclosure, a heat exchanger system includes a microchannel tube configured to flow a working fluid therethrough, where the microchannel tube has a first portion, a second portion, and a bend coupling the first portion and the second portion, where the first portion has a first header connection, the second portion has a second header connection, and where the bend is distal to the first header connection and the second header connection, and a single, integrated header having a first passage and a second passage, where the first header connection is fluidly coupled to the first passage, and where the second header connection is fluidly coupled to the second passage.

In a further embodiment of the present disclosure, a climate management system includes a heat exchanger configured to be positioned along a working fluid circuit of the climate management system, where the heat exchanger includes a microchannel tube configured to flow a working fluid therethrough, where the microchannel tube has a first portion, a second portion, and a bend coupling the first portion and the second portion, where the first portion includes a first header connection, the second portion includes a second header connection, where the bend is distal to the first header connection and the second header connection, and where the heat exchanger includes a support plate coupled to the bend and positioned between the first portion and the second portion of the microchannel tube.

Other features and advantages of the present application will be apparent from the following, more detailed description of the embodiments, taken in conjunction with the accompanying drawings which illustrate, by way of example, the principles of the application.

DETAILED DESCRIPTION

The present disclosure is directed to a heat exchanger configuration that reduces a number of conduits included in the heat exchanger, while reducing a capacity of the heat exchanger by a relatively small margin. Traditional heat exchangers may include relatively large numbers of conduits in order to increase a capacity of the heat exchanger. Additionally, to accommodate a larger amount of working fluid flow, existing heat exchangers may include multiple headers or manifolds that may have an increased cross-sectional area. For example, a first header of a heat exchanger may direct a flow of the working fluid into the conduits of the heat exchanger and a second header of the heat exchanger may direct the flow of the working fluid from the conduits of the heat exchanger to another component of the system. Unfortunately, including a relatively large number of conduits and increasing a size or number of the headers increases manufacturing costs of the heat exchanger, and thus, increases the overall costs of the system that utilizes the heat exchanger.

Accordingly, embodiments of the present disclosure are directed to a heat exchanger having a reduced number of conduits when compared to existing heat exchangers. In some embodiments, the heat exchanger may include a support plate that enables fins between conduits, or portions of a conduit, to effectively support a weight of the conduits. In some embodiments, a conduit of the heat exchanger may include a bend that directly couples a first portion of the conduit and a second portion of the conduit. The bend may enable the first portion of the conduit and the second portion of the conduit to be substantially parallel to one another. Further, the bend may be positioned distal to a first header connection of the first portion and a second header connection of the second portion. The support plate may be coupled to the bend and disposed between the first portion of the conduit and the second portion of the conduit. Further, the support plate may include fins extending from a first surface of the support plate toward the first portion of the conduit and also include fins extending from a second surface of the support plate, opposite the first surface, toward the second portion of the conduit. As such, the fins may include a reduced height when compared to fins extending from the first portion of the conduit to the second portion of the conduit.

Further, the heat exchanger may include an integrated header that includes a first passage fluidly coupled to the first portion of the conduit and a second passage fluidly coupled to the second portion of the conduit. In some embodiments, the first passage and the second passage may be fluidly isolated from one another via a divider. Additionally or alternatively, a third passage may be included in the integrated header to further separate the first passage from the second passage. The third passage may include air or a vacuum to block thermal energy transfer between fluid flowing through the first passage and fluid flowing through the second passage. In still further embodiments, the heat exchanger may include multiple header portions that are positioned adjacent to one another. As such, the first portion of the conduit may be coupled to a first header portion, and the second portion of the conduit may be coupled to a second header portion, where the first header portion and the second header portion are positioned adjacent to one another. In some embodiments, the first portion of the conduit and/or the second portion of the conduit may each include a header connection configured to interface with a header of the heat exchanger. In some embodiments, the header connection is twisted to facilitate insertion of the header connection into a slot or interface of the integrated header, the first header portion, and/or the second header portion. Further still, the heat exchanger may include a header that has a reduced size, or diameter, when compared to existing systems because the header may flow a reduced amount of working fluid as a result of a reduced number of tubes in the heat exchanger. In any case, a number of conduits of the heat exchanger, a number of headers, and/or a size of the header may be reduced in order to reduce a cost of the materials included in the heat exchanger without substantially reducing a capacity of the heat exchanger.

Turning now to the drawings, FIG. 1 illustrates a heating, ventilation, and air conditioning (HVAC) system for building environmental management that may employ one or more HVAC units. In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single packaged unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
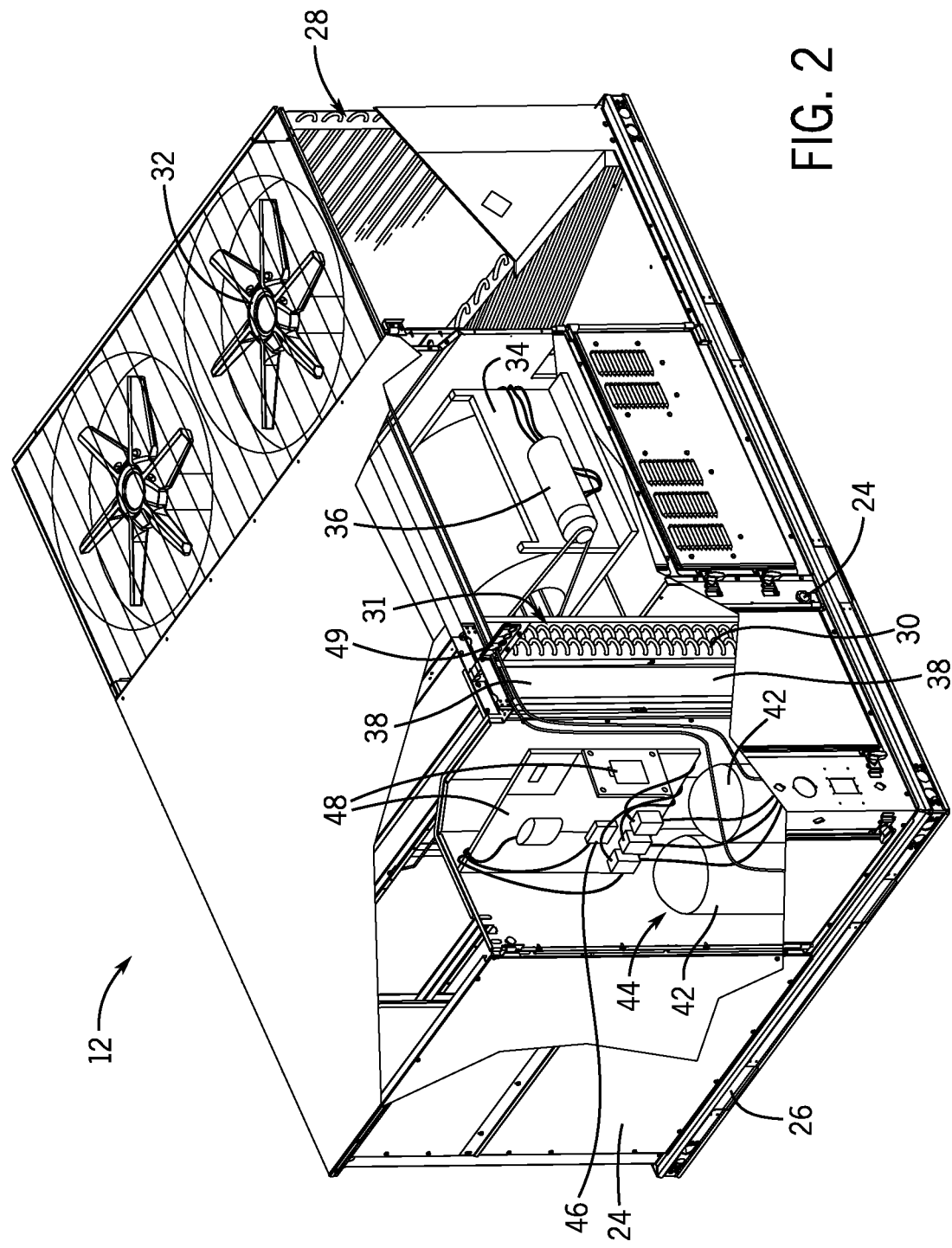
FIG. 2 is a perspective view of an embodiment of an HVAC unit that may be used in the environmental control system of FIG. 1, in accordance with an aspect of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant, such as R-410A, through the heat exchangers 28 and 30. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the rooftop unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
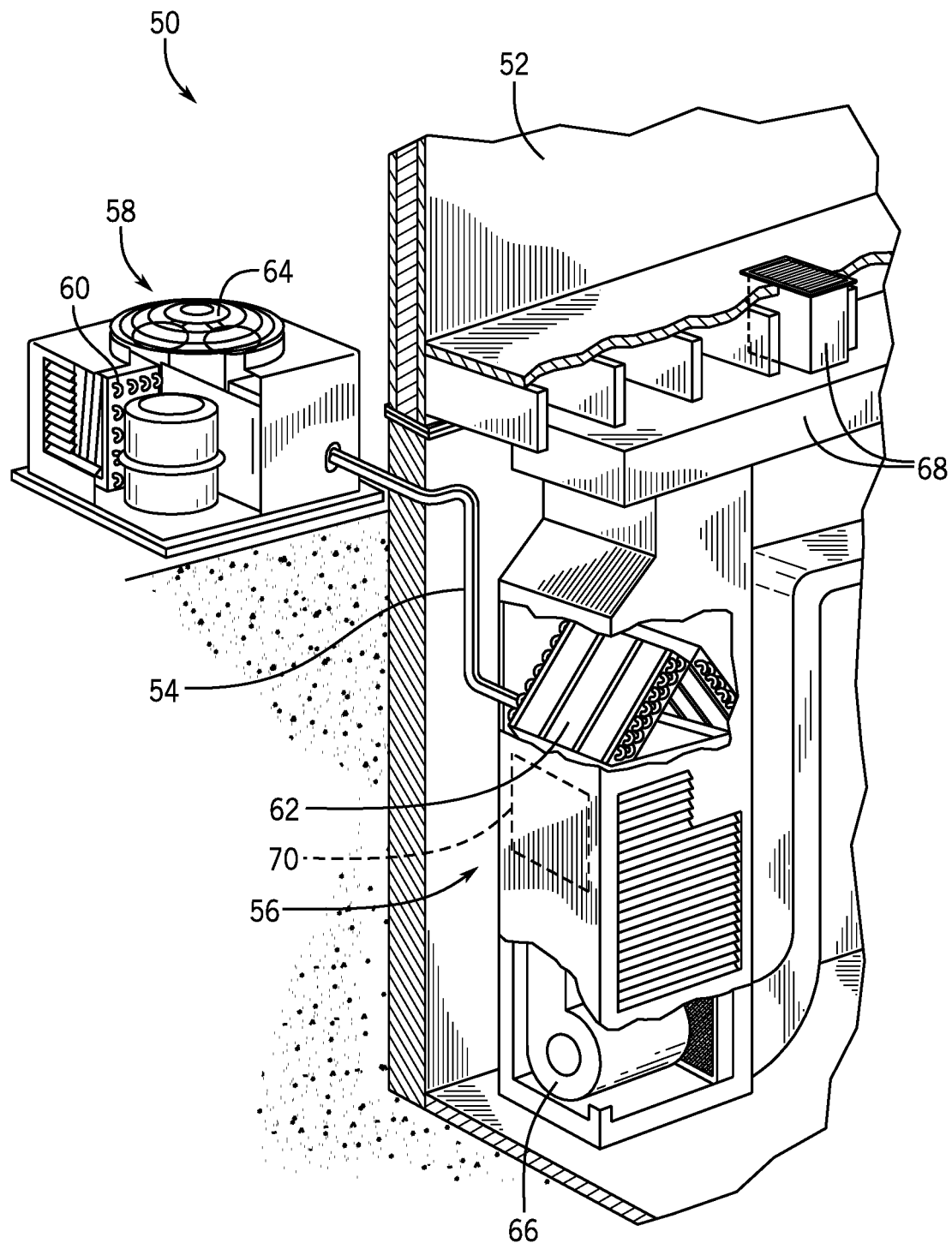
FIG. 3 is a schematic of an embodiment of a residential heating and cooling system, in accordance with an aspect of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or the set point plus a small amount, the residential heating and cooling system 50 may become operative to refrigerate additional air for circulation through the residence 52. When the temperature reaches the set point, or the set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over the outdoor heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
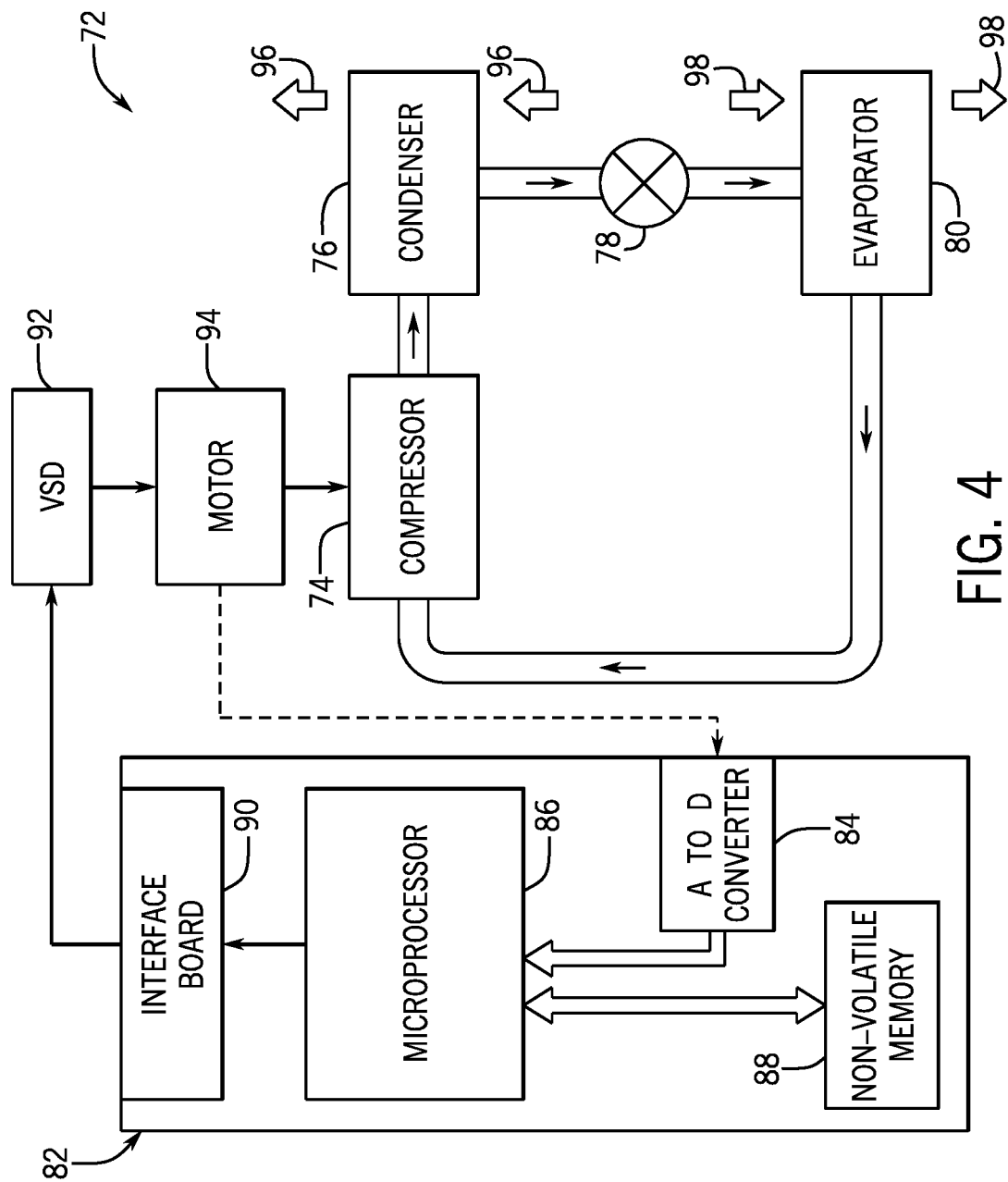
FIG. 4 is a schematic of an embodiment of a vapor compression system that can be used in any of the systems of FIGS. 1-3, in accordance with an aspect of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 38 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

Figure 5:
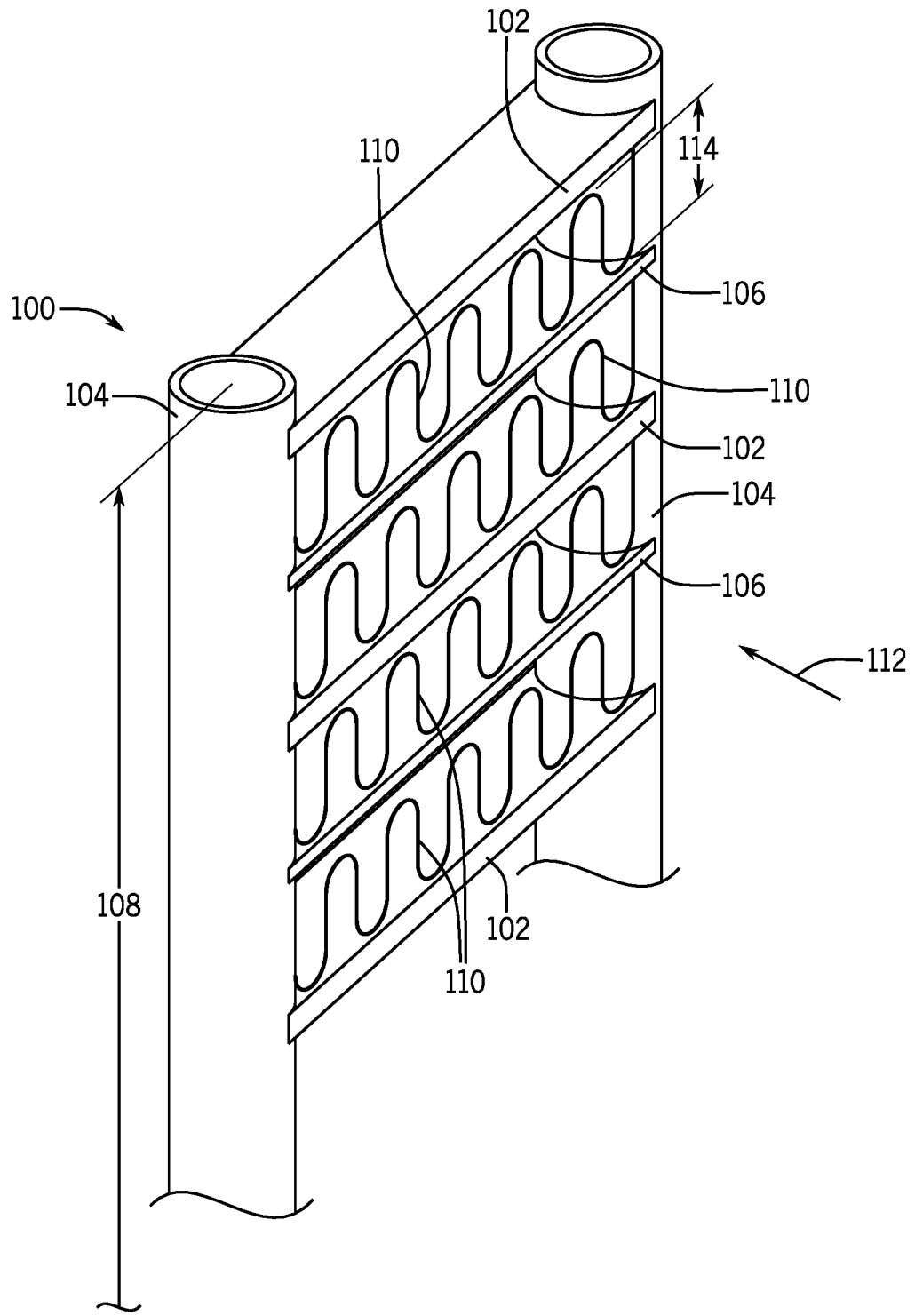
FIG. 5 is a perspective view of an embodiment of a heat exchanger that may be used in any of the systems of FIGS. 1-4, in accordance with an aspect of the present disclosure.

As set forth above, embodiments of the present disclosure are directed to a heat exchanger having a configuration that enables a reduction in a number of conduits to reduce costs without substantially reducing a capacity of the heat exchanger. For example, FIG. 5 is a perspective view of an embodiment of a heat exchanger 100, or heat exchanger system 100, which may be the condenser 76, the evaporator 80, or another heat exchanger included in the HVAC unit 12, the residential heating and cooling system 50, and/or the vapor compression system 72. As shown in the illustrated embodiment of FIG. 5, the heat exchanger 100 includes a plurality of conduits 102 extending between headers 104. The conduits 102 may include microchannel tubes, which may increase an efficiency of thermal energy transfer between a working fluid flowing through the conduits 102 and an airflow. Support plates 106 are disposed between adjacent conduits 102 with respect to a length 108 of the heat exchanger 100. Further still, the heat exchanger 100 includes fins 110 between the conduits 102 and the support plates 106. The fins 110 may increase a surface area over which an airflow 112 contacts the heat exchanger 100, such that an amount of thermal energy, or heat, transferred between a working fluid flowing through the conduits 102 and the airflow 112 is increased. The support plates 106 may enable a length 114 of the fins 110 between adjacent conduits 102 to be reduced when compared to fins that extend between adjacent conduits 102. The reduced length 114 of the fins 110 may enable the fins 110 to better support a weight of the conduits 102.

In some embodiments, the support plates 106 replace conduits that would otherwise be included in the heat exchanger 100. Accordingly, a flow or amount of working fluid passing through the heat exchanger 100 may be reduced. To substantially maintain a capacity of the heat exchanger 100, a flow rate of the airflow 112 across the conduits 102 may be increased to increase thermal energy transfer between the working fluid and the airflow 112. Additionally, a configuration of the fins 110 may be adjusted to increase thermal energy transfer between the working fluid and the airflow 112. For example, in some embodiments, a density, pitch, thickness, or another suitable parameter of the fins 110 may be modified to account for a reduction in a total number of the conduits 102 included in the heat exchanger 100. As a non-limiting example, the density of the fins 110 may be increased between 5% and 25%, between 10% and 20%, or between 12% and 16% when compared to a density of the fins 110 included in a heat exchanger having an increased number of conduits. For instance, the heat exchanger 100 may include between 25 and 30 fins per inch along the support plates 106 and/or the conduits 102. While a number of the fins 110 included in the heat exchanger 100 may increase, a cost of the fins 110 may be relatively low when compared to a cost of the conduits 102. Thus, a capacity of the heat exchanger 100 may be substantially maintained, while an overall cost of the heat exchanger 100 decreases.

Figure 6:
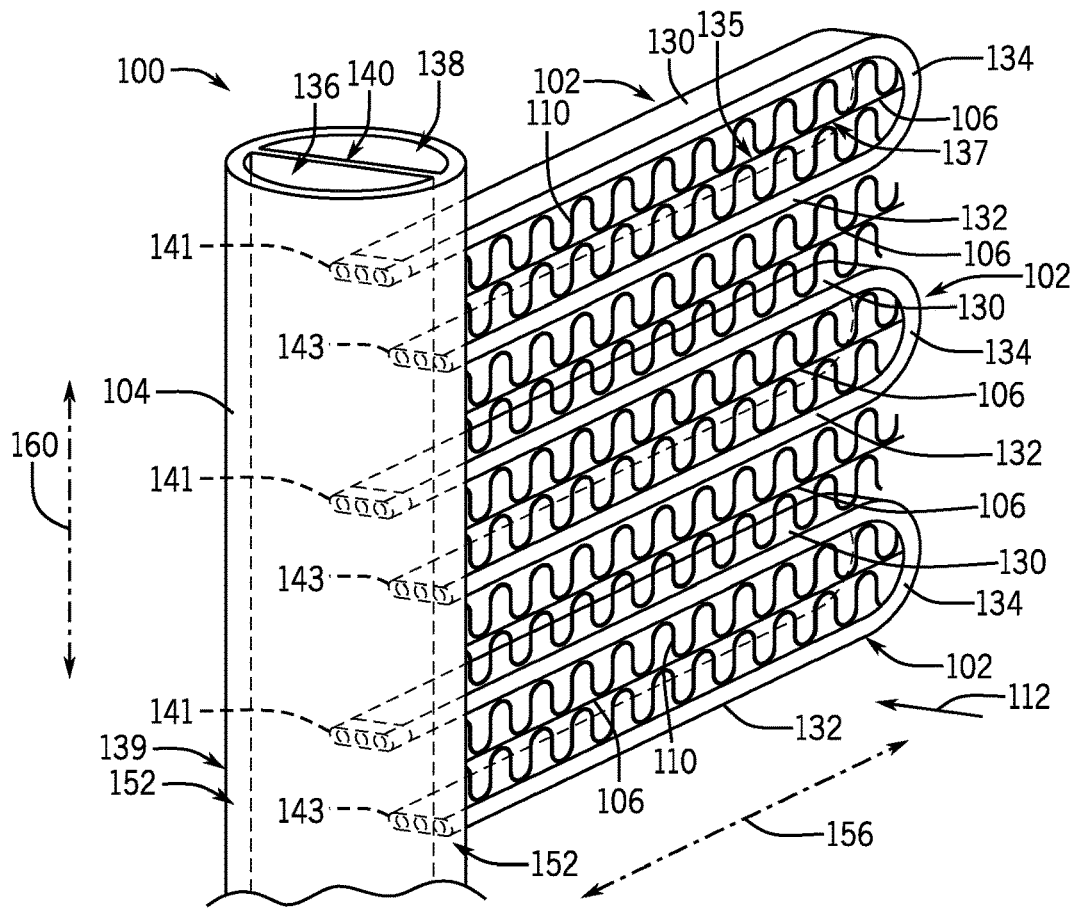
FIG. 6 is a perspective view of an embodiment of the heat exchanger that may be used in any of the systems of FIGS. 1-4, in accordance with an aspect of the present disclosure.

While the illustrated embodiment of FIG. 5 shows the conduits 102 extending between opposing headers 104 of the heat exchanger 100, in other embodiments, the heat exchanger 100 may include a single header 104. For instance, FIG. 6 is a perspective view of an embodiment of the heat exchanger 100 having a single header 104. As shown in the illustrated embodiment of FIG. 6, each of the conduits 102 includes a first portion 130, a second portion 132, and a bend 134 directly coupling the first portion 130 and the second portion 132. The support plate 106 is coupled to the bend 134 and is positioned between the first portion 130 and the second portion 132 of a respective conduit 102, as well as between adjacent conduits 102. Accordingly, the fins 110 may extend from both the first portion 130 and the second portion 132 to increase a surface area of contact for the airflow 112. Specifically, the fins 110 may extend from a first surface 135 of the support plate 106 toward the first portion 130 of the conduit 102 and from a second surface 137 toward the second portion 132 of the conduit 102.

In any case, the conduits 102 are positioned with respect to the header 104, such that the first portion 130 is configured to direct working fluid from the header 104 toward the bend 134, and the second portion 132 is configured to receive working fluid from the bend 134 and direct the working fluid back toward the header 104. As shown in the illustrated embodiment of FIG. 6, the header 104 include a first passage 136 and a second passage 138 separated by a divider 140, such that the first passage 136 and the second passage 138 are formed in a common housing 139. Specifically, a first header connection 141 of each first portion 130 of the conduits 102 is fluidly coupled with the first passage 136, and a second header connection 143 of each second portion 132 of the conduits 102 is fluidly coupled with the second passage 138. As such, the bend 134 of each conduit 102 is distal to the first header connection 141 and the second header connection 143 of the conduit 102. The divider 140 blocks a flow of the working fluid between the first passage 136 and the second passage 138, such that working fluid in the first passage 136 is substantially isolated from working fluid in the second passage 138.

Figure 7:
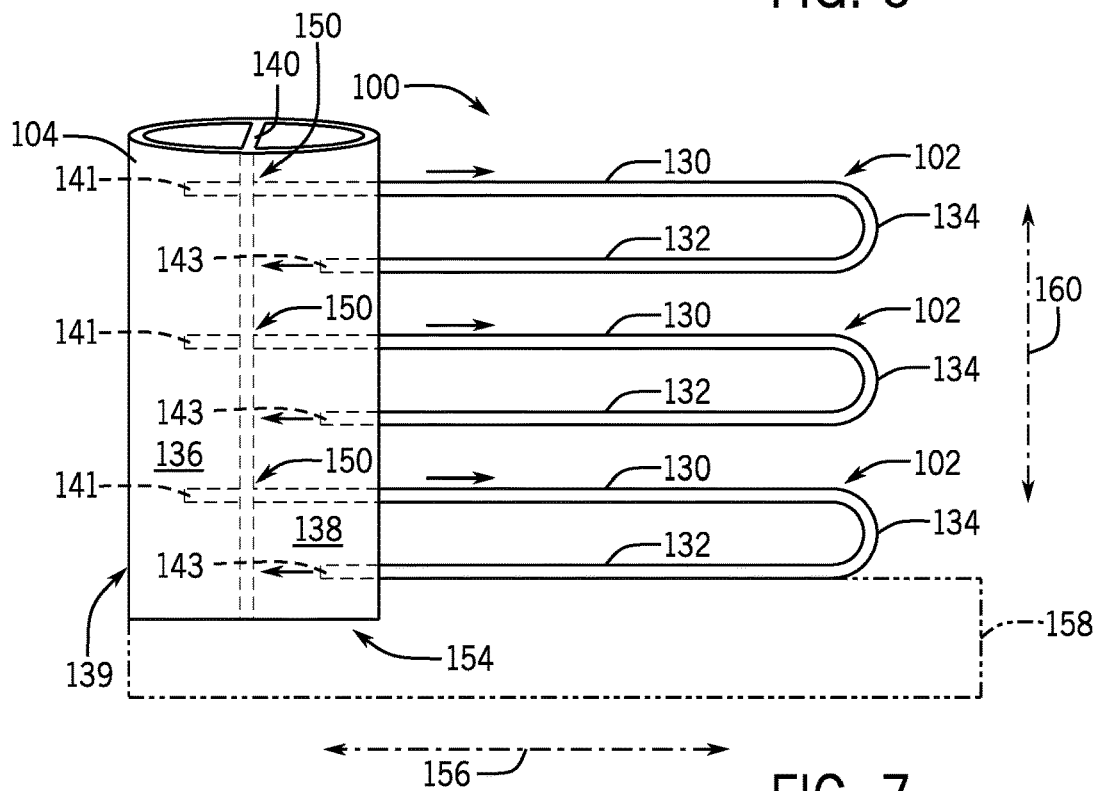
FIG. 7 is a cross-sectional view of an embodiment of the heat exchanger of FIG. 6, in accordance with an aspect of the present disclosure.

In some embodiments, the first portions 130 of the conduits 102 may extend through the second passage 138 and into the first passage 136. For example, FIG. 7 is a cross-sectional side view of an embodiment of the heat exchanger 100 having the single header 104. The first portions 130 of the conduits 102 extend through respective slots 150 formed in the divider 140, such that working fluid flow paths the first portions 130 are fluidly coupled to the first passage 136, but not with the second passage 138. While the first portions 130 of the conduits 102 may be in contact with the working fluid flowing through the second passage 138, passageways 152 within the second passage 138 may enable the working fluid to flow around the first portions 130 and toward an end 154 of the header 104. It should be noted that while the present discussion focuses on the working fluid flowing from the first passage 136 into the working fluid flow paths of the first portions 130 of the conduits 102, from the first portions 130 of the conduits 102 to the bends 134 of the conduits 102, from the bends 134 of the conduits 102 into the second portions 132 of the conduits 102, and from the second portions 132 of the conduits 102 into the second passage 138, other working fluid flow paths may be utilized. For instance, the working fluid may flow into the second passage 138 and into the second portions 132 of the conduits 102, from the second portions 132 of the conduits 102 toward the bends 134 of the conduits 102, from the bends 134 of the conduits 102 toward the first portions 130 of the conduits 102, and from the first portions 130 of the conduits 102 into the first passage 136.

As shown in the illustrated embodiments of FIGS. 6 and 7, the first portions 130 and the second portions 132 are substantially parallel with one another. Accordingly, the bend 134 forms a substantially 180 degree angle or is generally semi-circular. However, in other embodiments, the first portions 130 and the second portions 132 may not be substantially parallel to one another. For instance, in some embodiments, the second portions 132 may be angled downwards with respect to an axis 156 along which the conduits 102 extend from the header 104. The axis 156 may also define a longitudinal axis of the heat exchanger 100. For instance, the second portions 132 may be angled toward a base 158 of the heat exchanger 100 with respect to the axis 156. In other words, the bend 134 may form an angle between the first portion 130 and the second portion 132 that is between 170 degrees and 190 degrees, between 175 degrees and 185 degrees, or between 178 degrees and 182 degrees with respect to the axis 156. In such embodiments, a flow of working fluid may be facilitated from the bend 134 toward the second portion 132 via gravitational force.

Figure 8:
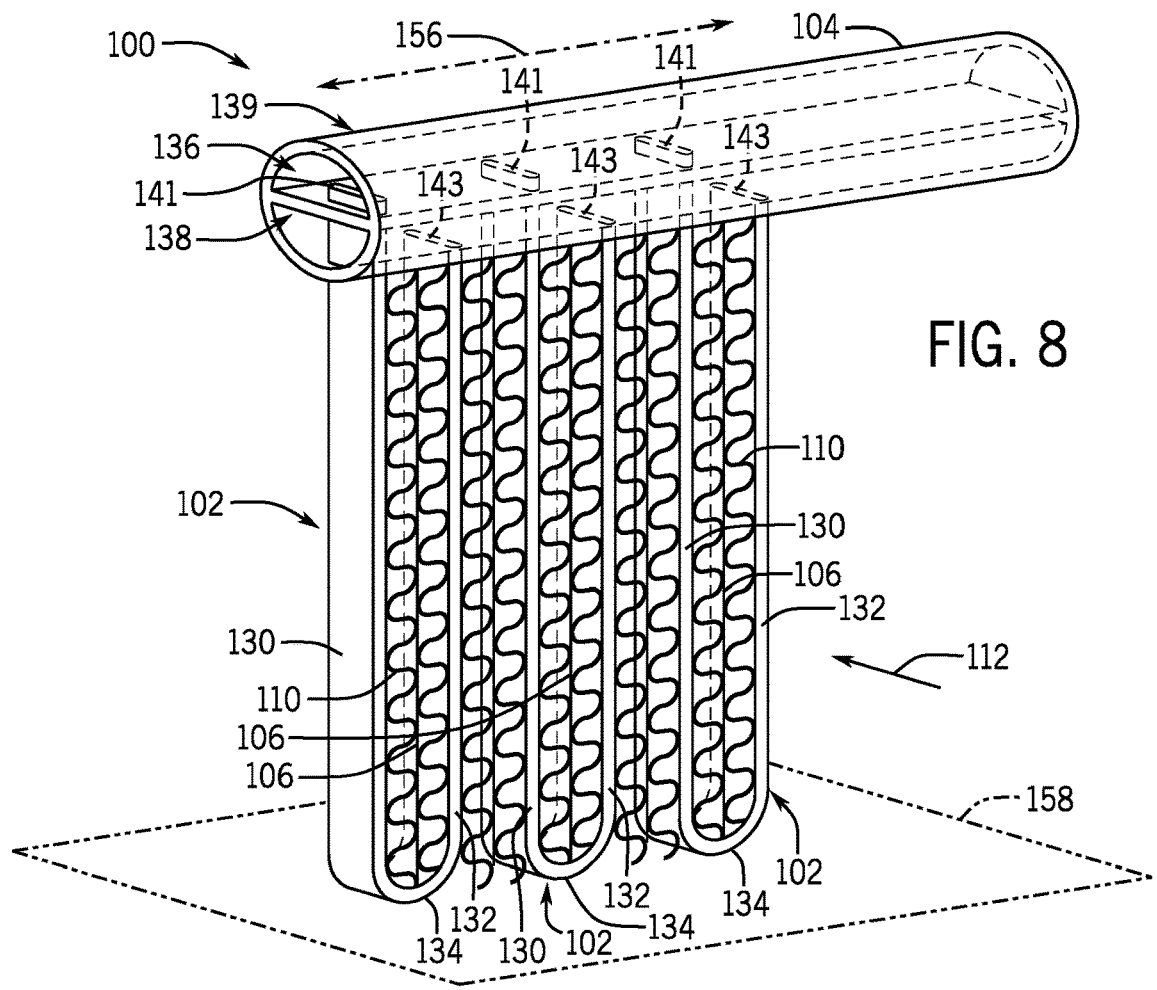
FIG. 8 is a perspective view of an embodiment of a heat exchanger that may be used in any of the systems of FIGS. 1-4, in accordance with an aspect of the present disclosure.
Figure 9:
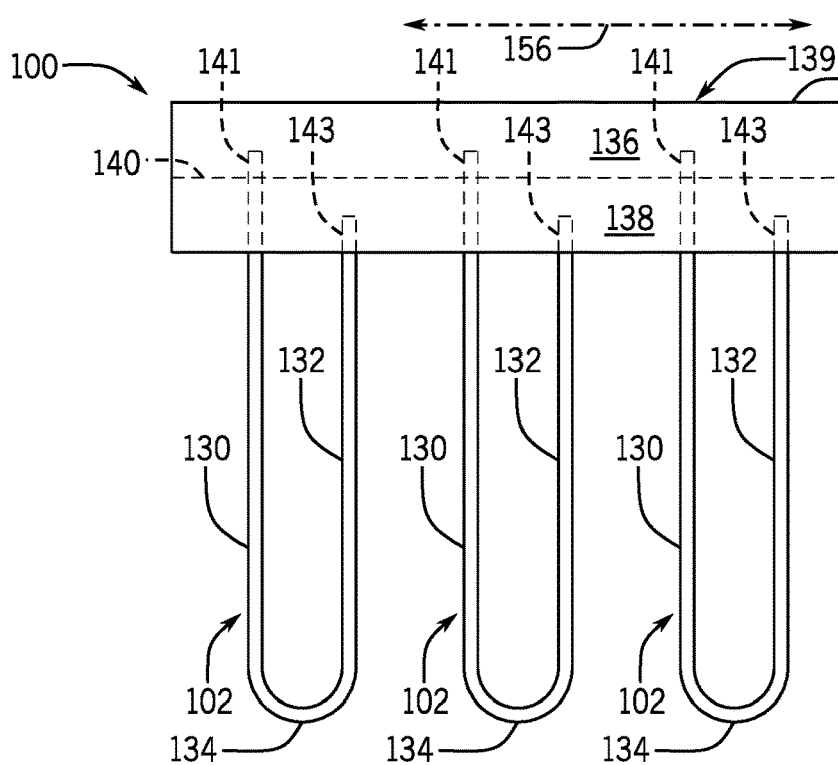
FIG. 9 is an elevation view of an embodiment of the heat exchanger of FIG. 8, in accordance with an aspect of the present disclosure.

The illustrated embodiment of FIGS. 6 and 7 show the header 104 extending along a vertical axis 160 with respect to the base 158 of the heat exchanger 100, for example. In other embodiments, the header 104 may extend along the axis 156. For instance, FIGS. 8 and 9 illustrate embodiments of the heat exchanger 100 having the single header 104 extending along the axis 156, which may be a generally horizontal axis. The illustrated embodiments of FIGS. 8 and 9 are substantially the same as the embodiments of FIGS. 6 and 7, except for the orientation of the header 104 with respect to the base 158 of the heat exchanger 100. In some embodiments, the heat exchanger 100 having the header 104 that extends along the axis 156 may be the evaporator 80 or a heat exchanger configured to transfer thermal energy from the airflow 112 to the working fluid flowing through the conduits 102. In other embodiments, the heat exchanger 100 having the header 104 extending along the axis 156 may be utilized as the condenser 76 or a heat exchanger configured to transfer thermal energy from the working fluid flowing through the conduits 102 to the airflow 112.

Figure 10:
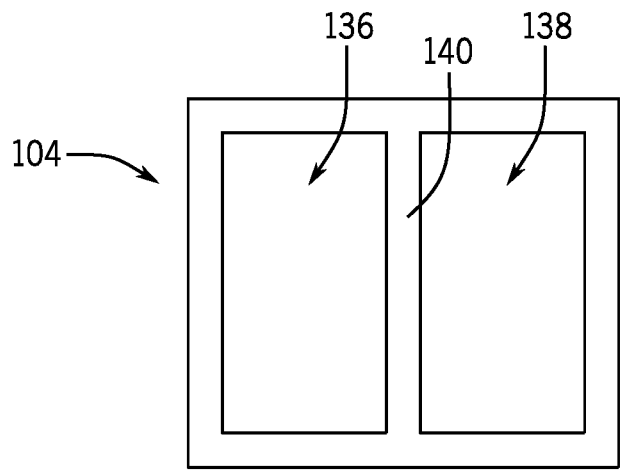
FIG. 10 is a cross-sectional view of an embodiment of a header that may be utilized with the heat exchangers of FIGS. 6-9, in accordance with an aspect of the present disclosure.

The illustrated embodiments of FIGS. 6-9 show the first passage 136 and the second passage 138 of the header 104 having substantially semi-circular cross sectional shapes. However, in other embodiments, the first passage 136 and the second passage 138 of the header 104 may include other suitable cross-sectional shapes. For instance, FIG. 10 is a cross-sectional view of an embodiment of the header 104, where the first passage 136 and the second passage 138 include substantially rectangular cross-sectional shapes. In still further embodiments of the header 104, the first passage 136, and the second passage 138 may include square, circular, triangular, another polygon, or any other suitable cross-sectional shapes. The first passage 136 and the second passage 138 may include the same cross-sectional shape or different cross-sectional shapes. Additionally, a size or area of the cross-sectional shapes of the first passage 136 and the second passage 138 may be the same or different from one another.

Figure 11:
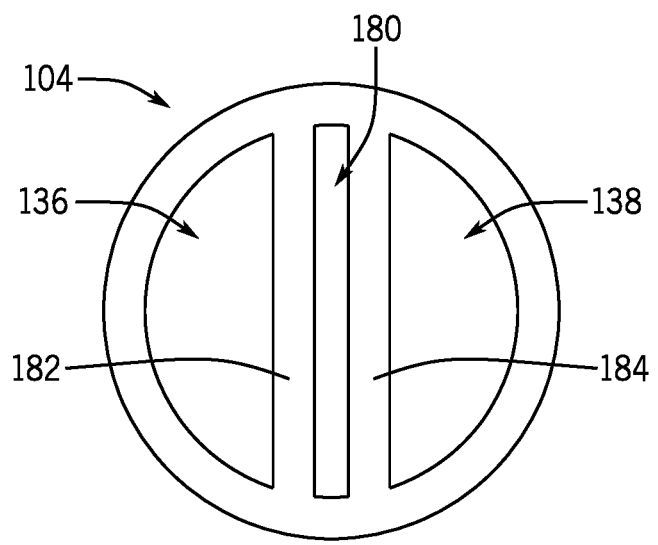
FIG. 11 is a cross-sectional view of an embodiment of a header that may be utilized with the heat exchangers of FIGS. 6-9, in accordance with an aspect of the present disclosure.

FIG. 11 is a cross-sectional view of an embodiment of the header 104 having a third passage 180 disposed between the first passage 136 and the second passage 138. The header 104 includes a first divider 182 between the first passage 136 and the third passage 180 and a second divider 184 between the second passage 138 and the third passage 180. In some embodiments, the third passage 180 includes a fluid that may block thermal energy transfer between the working fluid flowing through the first passage 136 and the working fluid flowing through the second passage 138. For instance, the third passage 180 may include air, which has a relatively low thermal conductivity. In other embodiments, the third passage 180 may be a vacuum that insulates the first passage 136 and the second passage 138 from one another. Utilizing the third passage 180 in a single, integrated header may improve an efficiency of the heat exchanger 100 by blocking thermal energy transfer between the first passage 136 and the second passage 138. For example, a relatively large temperature differential may occur between the working fluid flowing through the first passage 136 and the working fluid flowing through the second passage 138 as a result of thermal energy transfer between the working fluid and the airflow 112 in the first portion 130, the second portion 132, and the bend 134 of the conduits 102. Accordingly, the third passage 180 may block thermal energy transfer to avoid reversing the thermal energy transfer between the working fluid and the airflow 112 within the conduits 102.

Figure 12:
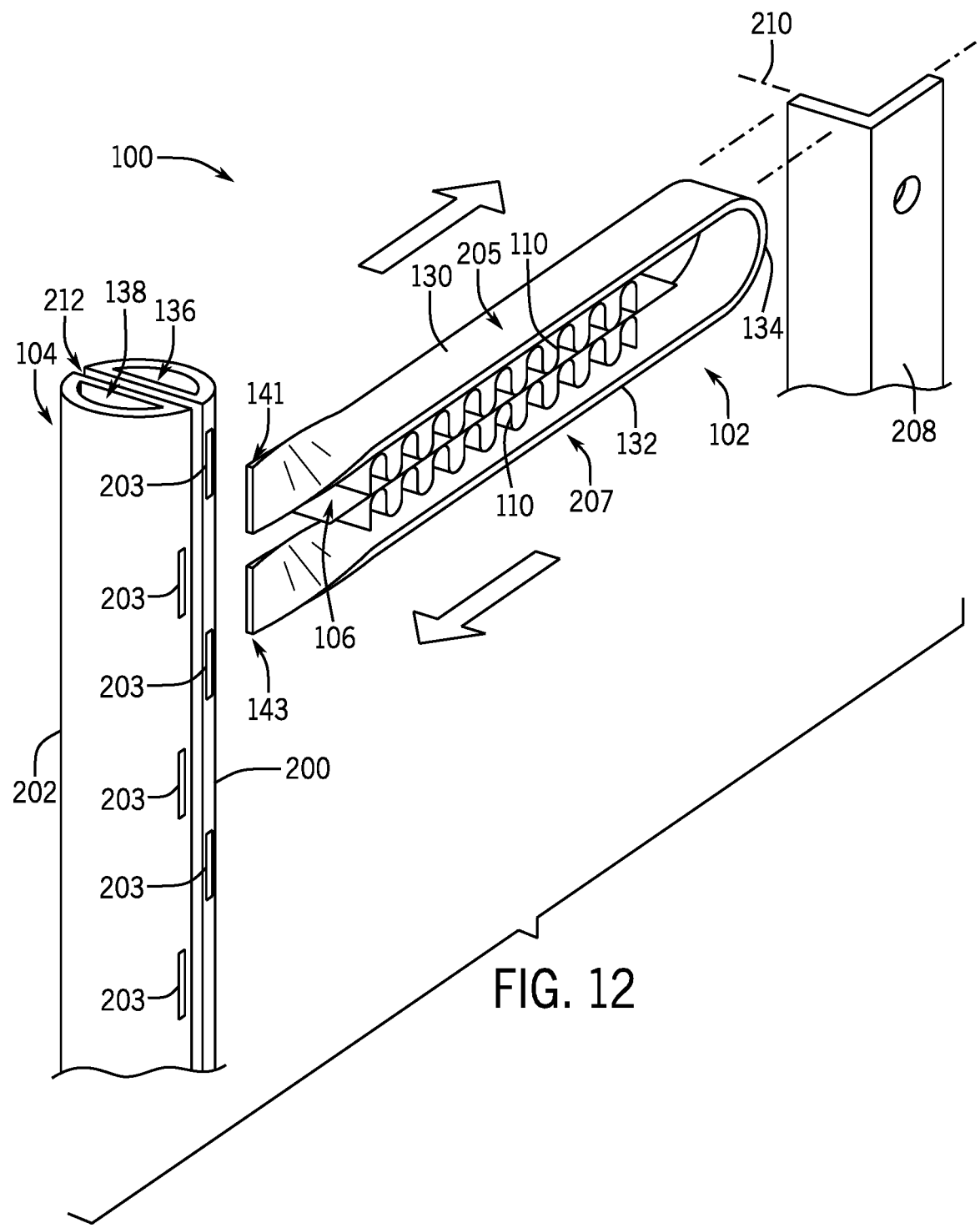
FIG. 12 is an exploded perspective view of an embodiment of the heat exchanger that may be used in the systems of FIGS. 1-4, in accordance with an aspect of the present disclosure.

In still further embodiments, the header 104 may include a first header portion 200 having the first passage 136 and a second header portion 202 having the second passage 138 that are separate from one another, but positioned adjacent to one another, such as on a same side of the heat exchanger 100. For instance, FIG. 12 is an exploded perspective view of an embodiment of the heat exchanger 100, where the header 104 includes the first header portion 200 and the second header portion 202 that are separate from one another. In some embodiments, the first header portion 200 and/or the second header portion 202 may be sized relatively small, such that a substantially flat, or horizontal, orientation of the first header connection 141 of the first portion 130 of the conduit 102 and a second header connection 143 of the second portion 132 of the conduit 102 may not be disposed in slots 203 formed in the first header portion 200 and the second header portion 202, respectively. Accordingly, the first header connection 141 and the second header connection 143 may be twisted from the substantially flat, or horizontal orientation to a twisted, or vertical, orientation to facilitate insertion into the slots 203. In some embodiments, the first header connection 141 and the second header connection 143 may be twisted approximately 90 degrees with respect to a first surface or body portion 205 of the first portion 130 of the conduit 102 and a second surface or body portion 207 of the second portion 132 of the conduit 102, respectively. In other words, the first header connection 141 may be positioned in a plane that is substantially crosswise to a plane of the first surface 205 of the first portion 130 of the conduit 102, and the second header connection 143 may be positioned in a plane that is substantially crosswise to a plane of the second surface 207 of the second portion 132 of the conduit 102. In other embodiments, the first and second header connections 141, 143 may be twisted between 50 degrees and 150 degrees, between 70 degrees and 130 degrees, or between 80 degrees and 100 degrees with respect to the first and second surfaces 205, 207, respectively. In any event, twisting the first and second header connections 141, 143 of the conduits 102 may enable a size of the header 104 to be reduced, thereby reducing costs of the header 104, and thus, the heat exchanger 100.

In some embodiments, the bend 134 of the conduits 102 may be coupled to a mounting bracket 208 that enables the heat exchanger 100 to be coupled to a housing 210 of an HVAC system and/or another structure of a system that utilizes the heat exchanger 100. For example, the bends 134 may be coupled to the mounting bracket 208 via a weld, fasteners, adhesives, clips, brackets, another suitable technique, or any combination thereof.

Figure 13:
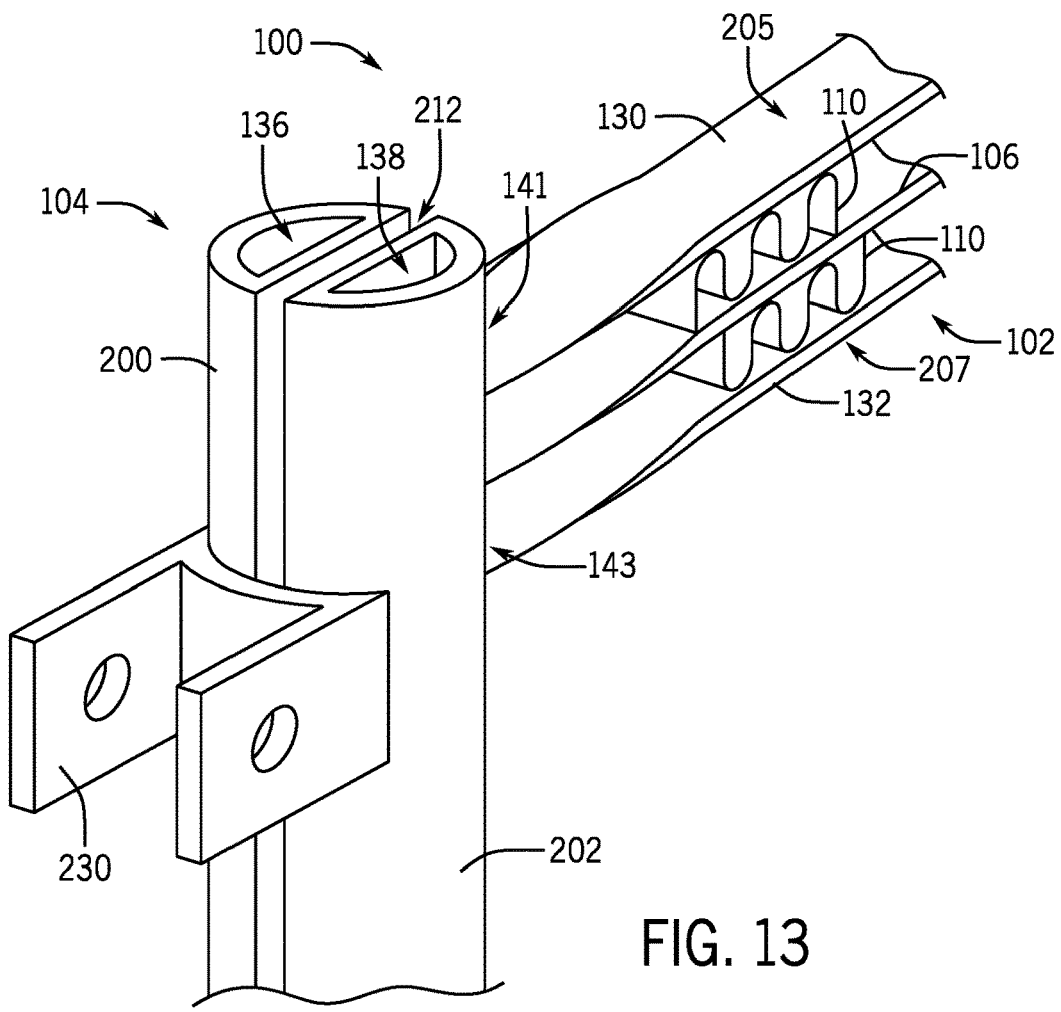
FIG. 13 is a perspective view of an embodiment of the heat exchanger of FIG. 12, in accordance with an aspect of the present disclosure.

As shown in the illustrated embodiment of FIG. 12, a gap 212 may separate the first header portion 200 and the second header portion 202 from one another. The gap 212 may also block thermal energy transfer between the working fluid flowing through the first header portion 200 and the working fluid flowing through the second header portion 202, similar to the third passage 180. In order to maintain the gap 212 between the first header portion 200 and the second header portion 202, a support bracket 230 may be coupled to both the first header portion 200 and the second header portion 202. For example, FIG. 13 is a perspective view of an embodiment of the support bracket 230 coupled to the first header portion 200 and the second header portion 202. In some embodiments, the support bracket 230 is coupled to the first header portion 200 and/or the second header portion 202 via brazing, welding, an adhesive, fasteners, clips, another suitable fastening technique, or any combination thereof. In any case, the support bracket 230 maintains the gap 212, which blocks thermal energy transfer between the first header portion 200 and the second header portion 202.

Figure 14:
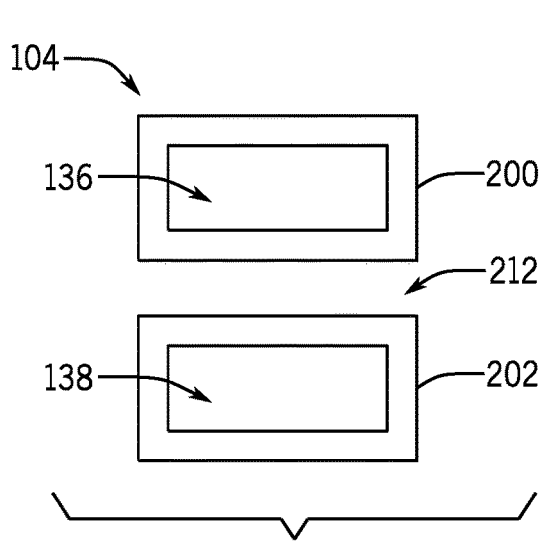
FIG. 14 is a cross-sectional view of an embodiment of a header that may be utilized with the heat exchangers of FIGS. 11 and 12, in accordance with an aspect of the present disclosure.
Figure 15:
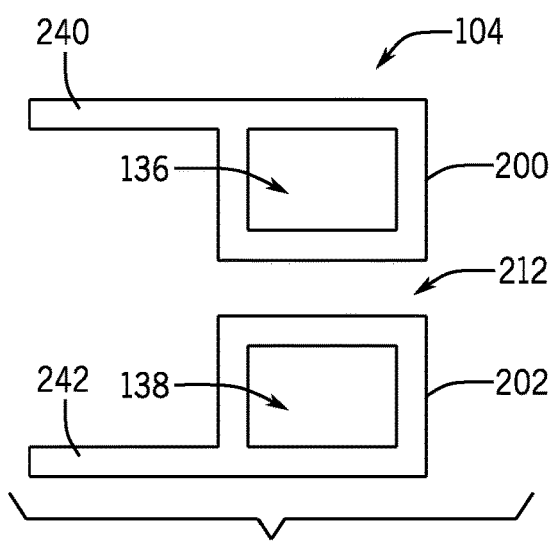
FIG. 15 is a cross-sectional view of an embodiment of a header that may be utilized with the heat exchangers of FIGS. 11 and 12, in accordance with an aspect of the present disclosure.

While the illustrated embodiments of FIGS. 12 and 13 show the first header portion 200 and the second header portion 202 having a substantially semi-circular cross sectional shape, the first header portion 200 and the second header portion 202 may include any suitable shape. For example, FIG. 14 is a cross-sectional view of an embodiment of the first header portion 200 and the second header portion 202 each including a substantially rectangular cross-sectional shape. Additionally, FIG. 15 is a cross-sectional view of an embodiment of the first header portion 200 and the second header portion having extensions 240, 242 that may replace the support bracket 230. For example, the first header portion 200 may be coupled to a beam or other structural component via the extension 240, and the second header portion 202 may be separately coupled to the beam or other structural component via the extension 242. The extensions 240, 242 may be coupled to the beam or other structural component, such that the gap 212 between the first header portion 200 and the second header portion 202 is substantially maintained. In other embodiments, the first header portion 200 and the second header portion 202 may include square, circular, triangular, another polygon, or any other suitable cross-sectional shapes. Additionally, the first header portion 200 and the second header portion 202 may include the same cross-sectional shape or different cross-sectional shapes. Further, a size or area of the cross-sectional shapes of the first header portion 200 and the second header portion 202 may be the same or different from one another. In still further embodiments, the header 104 may not include the gap 212 and the header 104 may include the integrated header 104 discussed above with reference to FIGS. 6-11.

Figure 16:
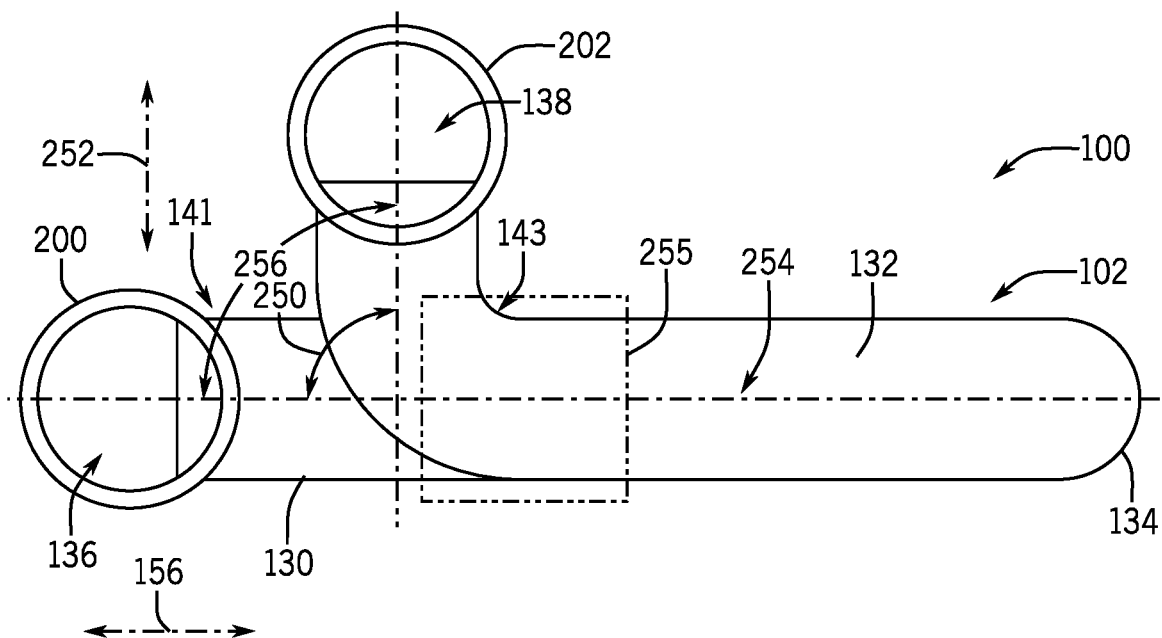
FIG. 16 is a plan view of an embodiment of the heat exchanger that may be used with the systems of FIGS. 1-4, in accordance with an aspect of the present disclosure.

FIG. 16 is a plan view of an embodiment of the heat exchanger 100 that includes the first header portion 200 and the second header portion 202 positioned at an angle 250 with respect to one another and with reference to the entire heat exchanger 100 and/or to the axis 156. In other words, the second header portion 202 may be positioned offset from the first header portion 200 with respect to both the axis 156 and an axis 252. As such, the second header connection 143 of the second portion 132 of the conduit 102 may be twisted with respect to a body portion 254 of the second portion 132. In other words, the second header connection 143 is twisted or bent with respect to the body portion 254 of the second portion 132, but remains in substantially the same plane 255 as the body portion 254 of the second portion 132. In some embodiments, an angle 256 formed between the second header connection 143 and the body portion 254 of the second portion 132 may be substantially equal to the angle 250 formed between the first header portion 200 and the second header portion 202. For example, as shown in the illustrated embodiment of FIG. 16, the angle 250 formed between the first header portion 200 and the second header portion 202 with respect to the longitudinal axis 156 of the heat exchanger 100 is approximately 90 degrees. As such, the angle 256 formed between the second header connection 143 and the body portion 254 of the second portion 132 may also be approximately 90 degrees. In other embodiments, the angle 250 and/or the angle 256 may be between 10 and 170 degrees, between 30 and 150 degrees, or between 75 and 105 degrees. In still further embodiments, the angle 250 and the angle 256 may not be substantially equal.

Figure 17:
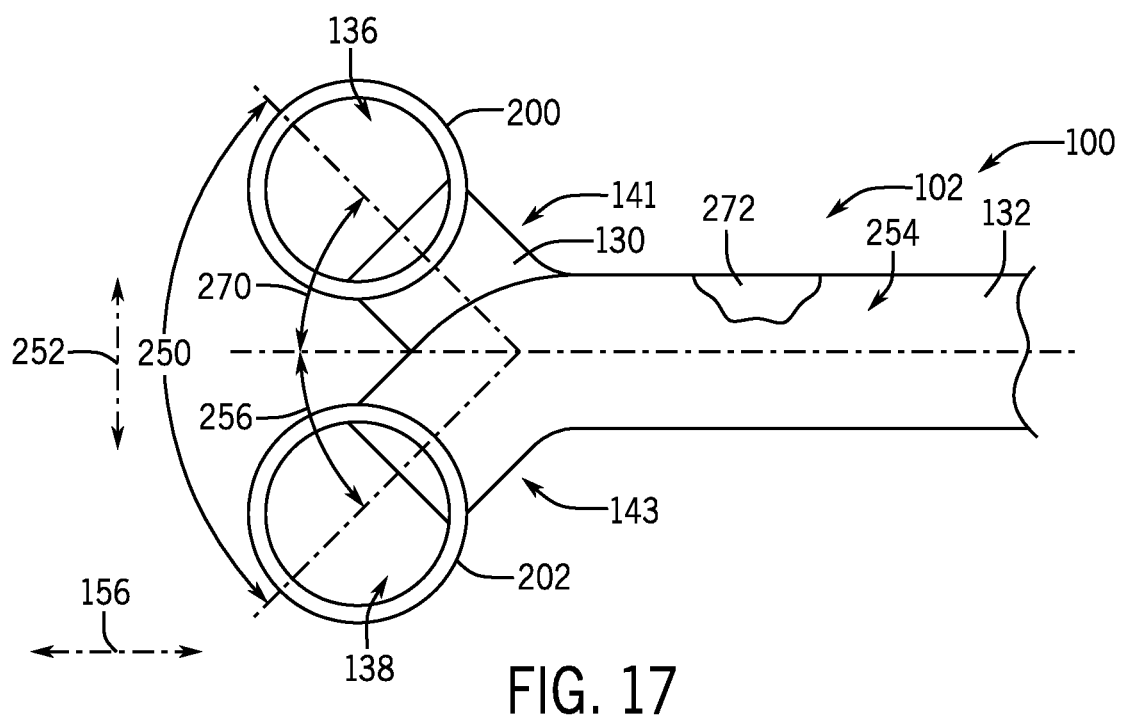
FIG. 17 is a plan view of an embodiment of the heat exchanger that may be used with the systems of FIGS. 1-4, in accordance with an aspect of the present disclosure.

For example, FIG. 17 is a plan view of an embodiment of the heat exchanger 100 where the first header connection 141 is also twisted and/or bent at an angle 270 with respect to a body portion 272 of the first portion 130 of the conduit 102. As such, the angle 250 between the first header portion 200 and the second header portion 202 relative to the entire heat exchanger 100 and/or the longitudinal axis 156 may be a sum of the angle 256 and the angle 270. As such, the angle 250 may be between 20 and 300 degrees, between 50 and 250 degrees, between 75 and 200 degrees, or between 85 and 175 degrees. In other embodiments, the angle 250 may include any suitable angle. While the illustrated embodiment of FIG. 17 shows the angle 256 and the angle 270 as being substantially equal, it should be noted that, in other embodiments, the angle 256 and the angle 270 may be different from one another.

Figure 18:
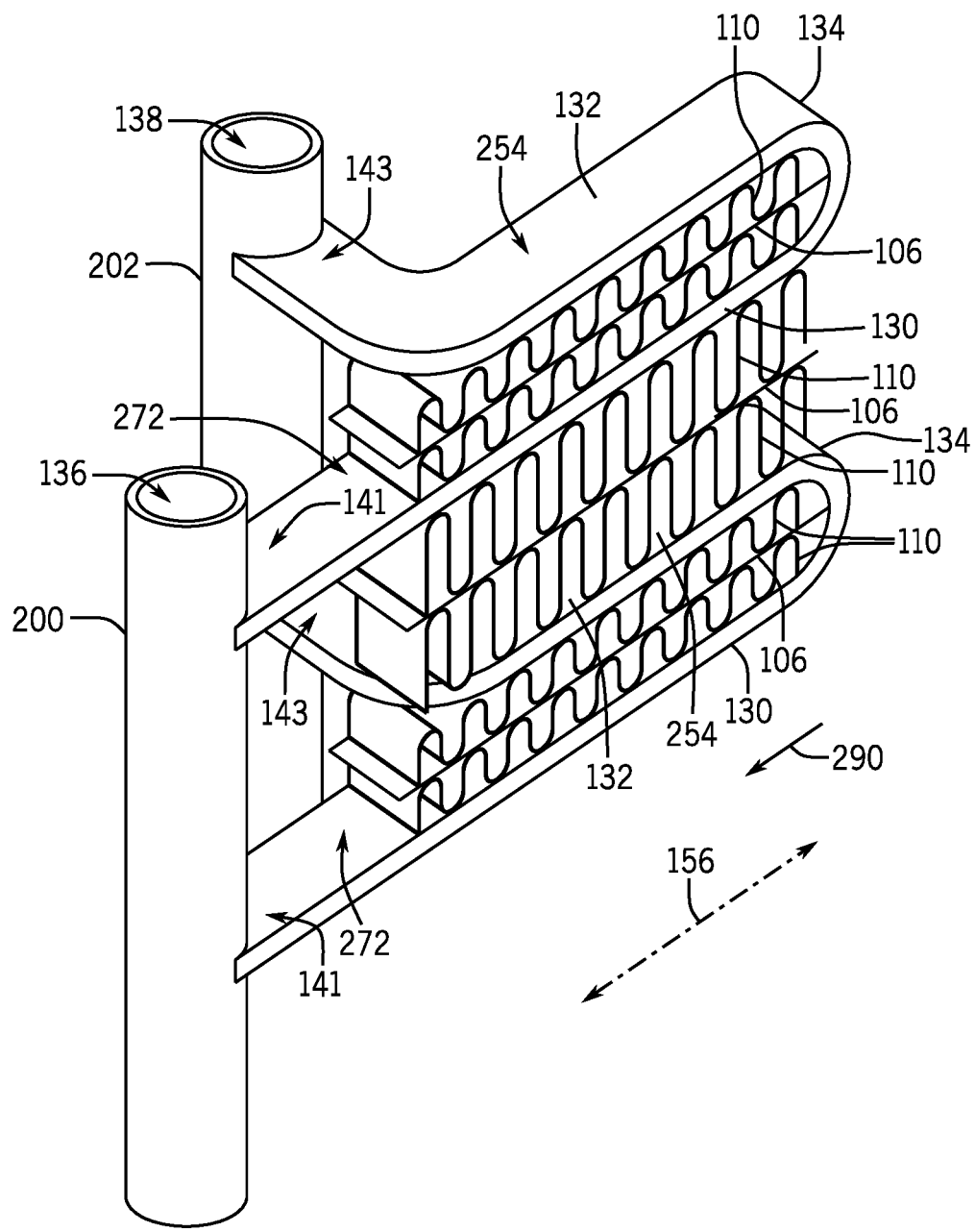
FIG. 18 is a perspective view of an embodiment of the heat exchanger of FIG. 16, in accordance with an aspect of the present disclosure.

FIG. 18 is a perspective view of an embodiment of the heat exchanger 100 having the first header portion 200 and the second header portion 202 offset from one another. As shown in the illustrated embodiment of FIG. 18, the fins 110 may be disposed between the first portion 130 and the second portion 134 of the conduits 102 extending from the bend 134 to a position that is approximately aligned with the second header portion 202 with respect to a direction 290 along the axis 156. Positioning the fins 110 beyond the second header portion 202 in the direction 290 along the axis 156 may not provide significant improvements of thermal energy transfer because the airflow 112 may be restricted, or otherwise limited, from flowing past the second header portion 202, or between the first header portion 200 and the second header portion 202. Accordingly, omitting additional fins 110 past the second header portion 202 in the direction 290 along the axis 156 may reduce a cost of the heat exchanger 100. However, in other embodiments, the fins 110 may extend beyond the second header portion 202 in the direction 290 along the axis 156.

Figure 19:
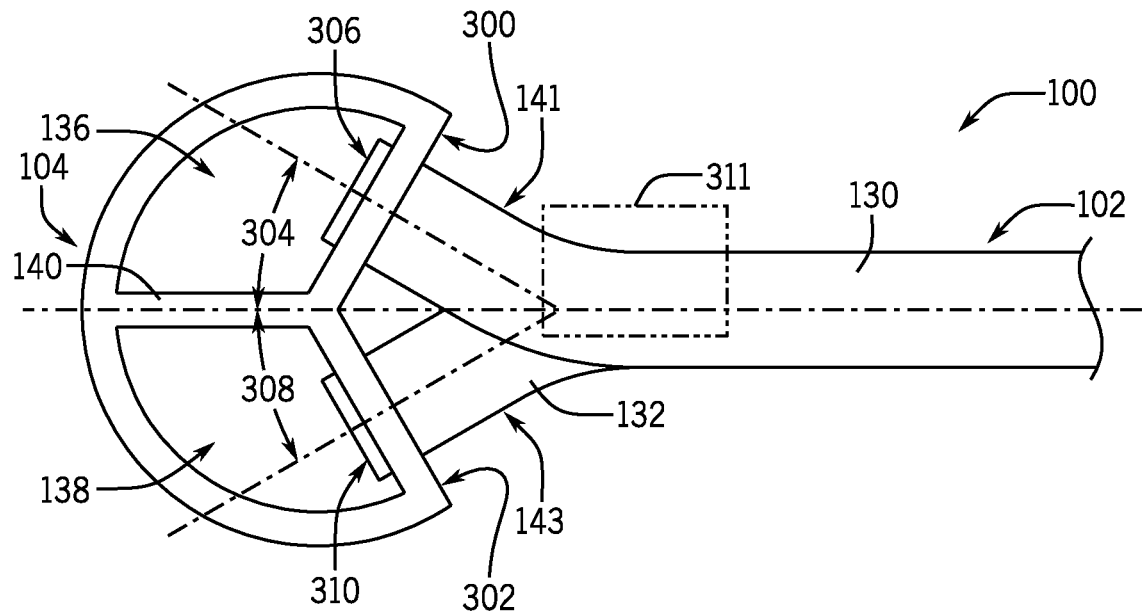
FIG. 19 is a plan view of an embodiment of the heat exchanger that may be used with the systems of FIGS. 1-4, in accordance with an aspect of the present disclosure.

FIG. 19 is a plan view of an embodiment of the single, integrated header 104 that may be configured to receive the first header connection 141 and the second header connection 143 of each of the conduits 102. As shown in the illustrated embodiment, a cross-sectional shape of the integrated header 104 may include a circular sector or segment as opposed to the full circular cross-sectional shape of FIGS. 6-9. As such, the first header connection 141 and the second header connection 143 of the conduits 102 may be twisted and/or bent to insert the first header connection 141 and the second header connection 143 into a first face 300 and a second face 302 of the header 104, respectively. In other words, the first header connection 141 may be twisted and/or bent at an angle 304 with respect to the body 272 of the first portion 130 that enables a surface 306 of the first header connection 141 to be substantially parallel to the first face 300 of the header 104. Similarly, the second header connection 143 may be twisted and/or at an angle 308 that enables a surface 310 of the second header connection 143 to be substantially parallel to the second face 302 of the header 104. The first header connection 141 is twisted, such that the first header connection 141 is within substantially the same plane 311 as the body portion 272 of the first portion 130 of the conduit 102. Additionally, the second header connection 143 may be twisted and remain in substantially the same plane 311 as the body portion 254 of the second portion 132 of the conduit 102.

Figure 20:
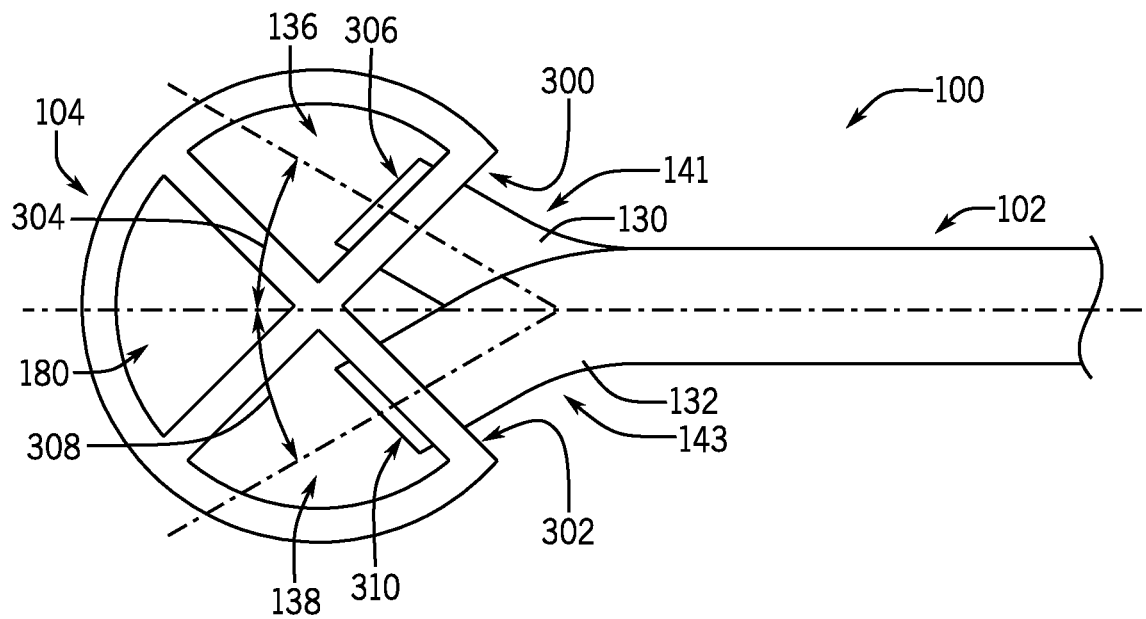
FIG. 20 is a plan view of an embodiment of the heat exchanger that may be used with the systems of FIGS. 1-4, in accordance with an aspect of the present disclosure.

In the illustrated embodiment of FIG. 19, the header 104 includes the first passage 136 and the second passage 138 adjacent to one another, but separated by the divider 140. In other embodiments, the header 104 may include the third passage 180, which further isolates the first passage 136 and the second passage 138 from one another. For example, FIG. 20 is a plan view of an embodiment of the header 104 having the third passage 180 separating the first passage 136 and the second passage 138 from one another. Specifically, the third passage 180 may block thermal energy transfer between the working fluid flowing through the first passage 136 and the working fluid flowing through the second passage 136. As discussed above, the third passage 180 may include a fluid, such as air, that may include a relatively low thermal conductivity, such that the fluid blocks thermal energy transfer between the first passage 136 and the second passage 138. Alternatively, the third passage 180 may include a vacuum to further reduce thermal energy transfer between the first passage 136 and the second passage 138.

Figure 21:
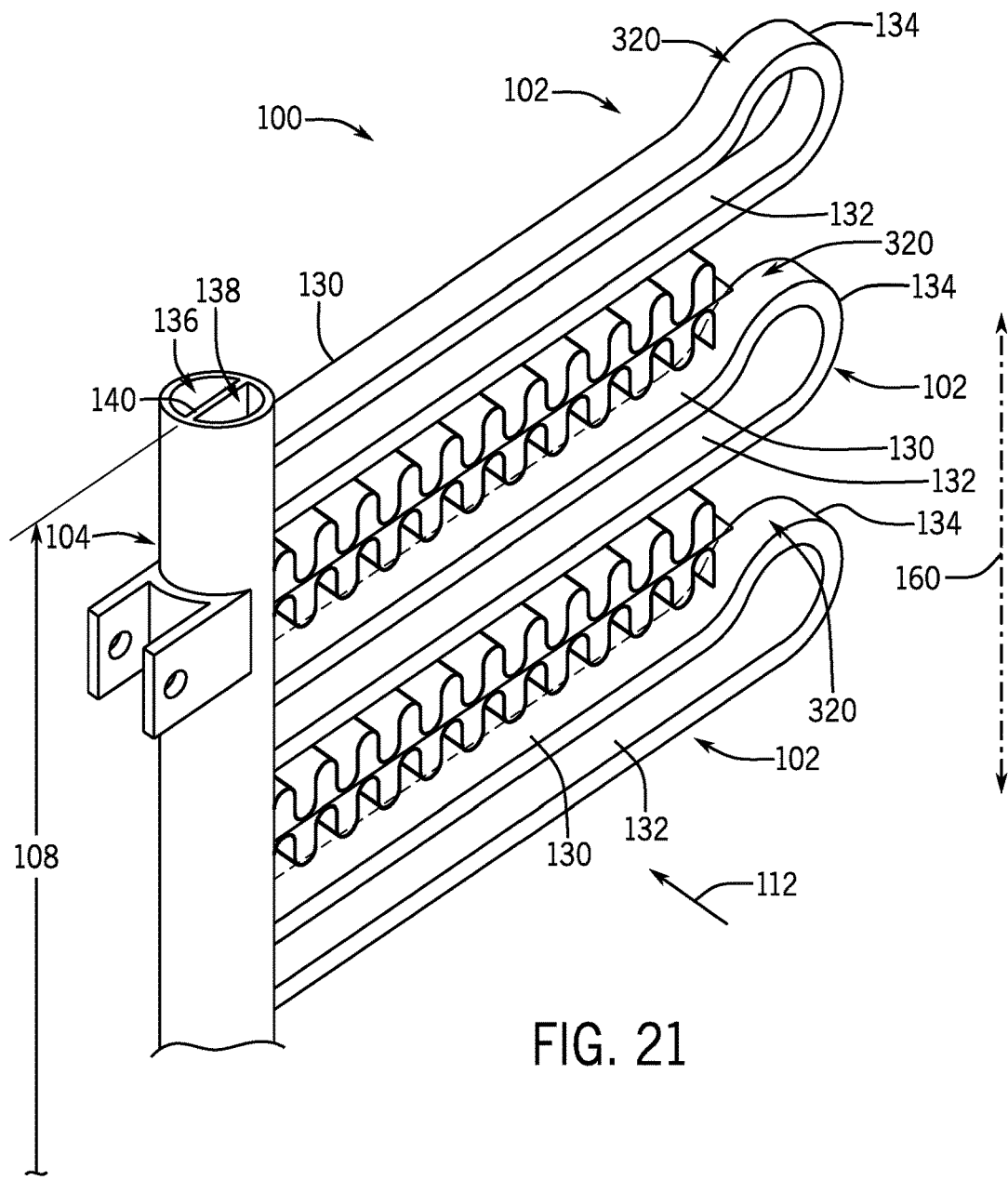
FIG. 21 is a perspective view of an embodiment of the heat exchanger that may be used with the systems of FIGS. 1-4, in accordance with an aspect of the present disclosure.

In the embodiments of FIGS. 6-20, the conduits 102 included the first portion 130 and the second portion 132, where the second portion 132 is offset from the first portion 130 along the vertical axis 160, or the length 108 of the heat exchanger 100. However, in other embodiments, the bend 134 may be configured to enable the first portion 130 and the second portion 132 to be aligned or adjacent to one another at a common location along the vertical axis 160. For example, FIG. 21 is a perspective view of an embodiment of the heat exchanger 100 having the first portion 130 and the second portion 132 of the conduits 102 adjacent and aligned with one another at a common location along the vertical axis 160. Aligning the first and second portions 130, 132 at a common location along the vertical axis 160 may reduce the length 108 of the heat exchanger 100, while maintaining the same amount of the conduits 102.

Figure 22:
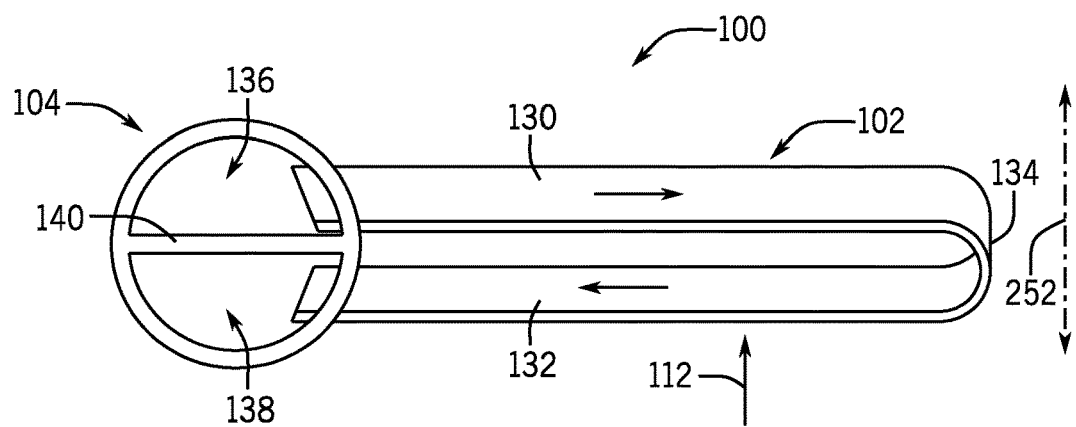
FIG. 22 is a plan view of an embodiment of the heat exchanger of FIG. 21, in accordance with an aspect of the present disclosure.

As shown in the illustrated embodiment of FIG. 21, the bend 134 includes a hairpin curvature, such that a portion 320 of the bend 134 may be configured to be positioned above the first portion 130 and the second portion 132 of the conduits 102 with respect to the vertical axis 160. The bend 134 may also curve back downward along the vertical axis 160 to enable the second portion 132 to be substantially aligned with the first portion 130 at a common location along the vertical axis 160. In some embodiments, the first portion 130 and the second portion 132 are positioned side-by-side along the axis 252, as shown in FIG. 22. In some embodiments, working fluid flows through the first portion 130 before flowing through the bend 134 and then through the second portion 132 of the conduits 102. As such, an efficiency of the heat exchanger 100 may be increased by positioning the second portion 132 of the conduits 102 upstream of the first portion 130 of the conduits 102 with respect to the airflow 112. For instance, the working fluid flowing through the first portion 130 of the conduits 102 may be pre-cooled, or pre-heated, with the airflow 112 that has cooled or heated the working fluid downstream of the first portion 130 and flowing through the second portion 132 of the conduits 102. However, in other embodiments, the working fluid may flow through the second portion 132 of the conduits 102 before flowing through the first portion 130 of the conduits 102.

In any event, working fluid may flow into and out of the conduits 102 via the header 104. As shown in the illustrated embodiment of FIGS. 21 and 22, the header 104 includes the integrated header 104 having the first passage 136 and the second passage 138 separated by the divider 140. While the illustrated embodiments of FIGS. 21 and 22 show the first passage 136 and the second passage 138 having a substantially semi-circular cross sectional shape, the first passage 136 and the second passage 138 may include any suitable cross-sectional shape, as discussed above. Additionally, or alternatively, the header 104 may include the first header portion 200 and the second header portion 202 configuration.

As set forth above, embodiments of the present disclosure may provide one or more technical effects useful in reducing a cost and/or size of a heat exchanger. For example, embodiments of the present disclosure are directed to a heat exchanger having a conduit and/or header configuration that enables a reduction in a number of conduits, a number of headers, and/or a size of the headers without substantially compromising a thermal energy transfer capacity of the heat exchanger. To account for a reduced amount of working fluid flowing through the heat exchanger, a flow rate of an airflow across the conduits may be increased, an amount of fins may be increased, a configuration of the fins may be modified, and/or another suitable modification may be made to the heat exchanger. In some embodiments, the heat exchanger may include support plates disposed between conduits to provide support for the conduits and/or fins that extend from the conduits of the heat exchanger. Additionally, the conduits may include a first portion, a second portion, and a bend directly coupling the first portion and the second portion. The bend is distal to a first header connection of the first portion and a second header connection of the second portion. While the conduits may be increased in size, a number of the conduits may be reduced. Moreover, including the bend in the conduits enables the conduits to be fluidly coupled to a single header. In some embodiments, the header includes a first passage fluidly coupled to the first portion of the conduits and a second passage fluidly coupled to the second portion of the conduits. The first passage may direct working fluid toward the conduits, and the second passage may direct working fluid out of the conduits. Further still, the header may include a third passage that blocks or restricts thermal energy transfer between the first and second passages of the header. The conduits may include bends, twists, or other suitable features that enable the conduits to interface with the header and to reduce a size of the heat exchanger. Overall, an amount of conduits of the heat exchanger may be reduced when compared to existing heat exchangers to reduce a cost of the heat exchanger. The technical effects and technical problems in the specification are examples and are not limiting. It should be noted that the embodiments described in the specification may have other technical effects and can solve other technical problems.

While only certain features and embodiments have been illustrated and described, many modifications and changes may occur to those skilled in the art, such as variations in sizes, dimensions, structures, shapes and proportions of the various elements, values of parameters, such as temperatures and pressures, mounting arrangements, use of materials, colors, orientations, and so forth, without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described, such as those unrelated to the presently contemplated best mode, or those unrelated to enablement. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A heat exchanger, comprising
a tube configured to receive a flow of working fluid, wherein the tube comprises a first portion having a first body portion and a first header connection, a second portion having a second body portion and a second header connection, and a bend extending from the first portion to the second portion; and
a header comprising a first header portion coupled to the first header connection, a second header portion coupled to the second header connection, and a divider separating the first header portion and the second header portion, wherein the header extends along a longitudinal axis, the second portion is offset from the first portion along the longitudinal axis of the header, the second body portion and the first body portion are aligned along the longitudinal axis of the header, and the first body portion extends from the first header portion, through the divider, through the second header portion, and to the bend.

2. The heat exchanger of claim 1, wherein the first body portion extends along a first axis.

3. The heat exchanger of claim 2, wherein the second body portion extends along the first axis.

4. The heat exchanger of claim 1, wherein the bend extends from the first portion to the second portion in a direction along the longitudinal axis of the header.

5. The heat exchanger of claim 1, wherein the bend forms an angle between the first portion and the second portion, and the angle is between 170 degrees and 190 degrees such that the first portion, the second portion, or both are sloped with respect to the longitudinal axis of the header.

6. The heat exchanger of claim 1, comprising a mounting bracket coupled to the bend and configured to couple to a structure of a heating, ventilation, and/or air conditioning (HVAC) system to support the tube.

7. The heat exchanger of claim 1, comprising heat exchange fins extending from the first portion and to the second portion to occupy a space between the first portion and the second portion.

8. A heat exchanger, comprising:
a tube configured to receive a flow of working fluid, wherein the tube comprises a first portion having a first body portion and a first header connection, a second portion having a second body portion and a second header connection, and a bend extending from the first portion to the second portion, wherein the first body portion and the second body portion extend along an axis; and
a header configured to direct the flow of working fluid to and from the tube, wherein the header extends along a longitudinal axis, and the header comprises:
a first header portion mounted to the first header connection;
a second header portion mounted to the second header connection; and
a divider separating the first header portion and the second header portion,
wherein the second portion is offset from the first portion along the longitudinal axis of the header, the second body portion and the first body portion are aligned with one another along the longitudinal axis of the header, and the first body portion extends from the first header portion, through the divider, through the second header portion, and to the bend.

9. The heat exchanger of claim 8, wherein the bend extends from the first portion to the second portion in a direction along the longitudinal axis of the header.

10. The heat exchanger of claim 8, wherein the tube defines a working fluid flow path through the tube, wherein a width of the second portion of the tube extends crosswise to a direction of the flow of working fluid along the working fluid flow path, wherein the width of the second portion extends along a plane, and wherein the second header connection and the second body portion extend along the plane.

11. The heat exchanger of claim 8, wherein the tube is a microchannel tube having a plurality of fluid passages formed therein.

12. A heat exchanger, comprising:
a tube comprising a first portion, a second portion, and a bend extending from the first portion to the second portion, wherein the first portion comprises a first body portion and a first header connection, the second portion comprises a second body portion and a second header connection, the first body portion and the second body portion extend along an axis; and
a header comprising a first header portion, a second header portion, a divider separating the first header portion and the second header portion, and a longitudinal axis, wherein the first header portion is attached to the first header connection, the first header connection is fluidly coupled to the first header portion, the second header portion is attached to the second header connection, the second header connection is fluidly coupled to the second header portion, the second portion is offset from the first portion along the longitudinal axis of the header, the first body portion and the second body portion are stacked along the longitudinal axis of the header, and the first body portion extends from the first header portion, through the divider, through the second header portion, and to the bend.

13. The heat exchanger of claim 12, wherein the bend extends from the first portion to the second portion in a direction along the longitudinal axis of the header.

14. The heat exchanger of claim 12, comprising a plurality of heat exchange fins extending from the first portion to the second portion to occupy a space between the first portion and the second portion.

15. The heat exchanger of claim 14, comprising:
an additional tube comprising a third portion, a fourth portion, and an additional bend extending from the third portion to the fourth portion, wherein the third portion comprises a third header connection attached to the first header portion and the fourth portion comprises a fourth header connection attached to the second header portion; and
an additional plurality of heat exchange fins extending from the first portion to the fourth portion to occupy an additional space between the first portion and the fourth portion.

16. The heat exchanger of claim 2, wherein the second body portion extends at an angle relative to the first axis.

17. The heat exchanger of claim 12, wherein the bend is semi-circular.

\* \* \* \* \*